Patented May 5, 1931

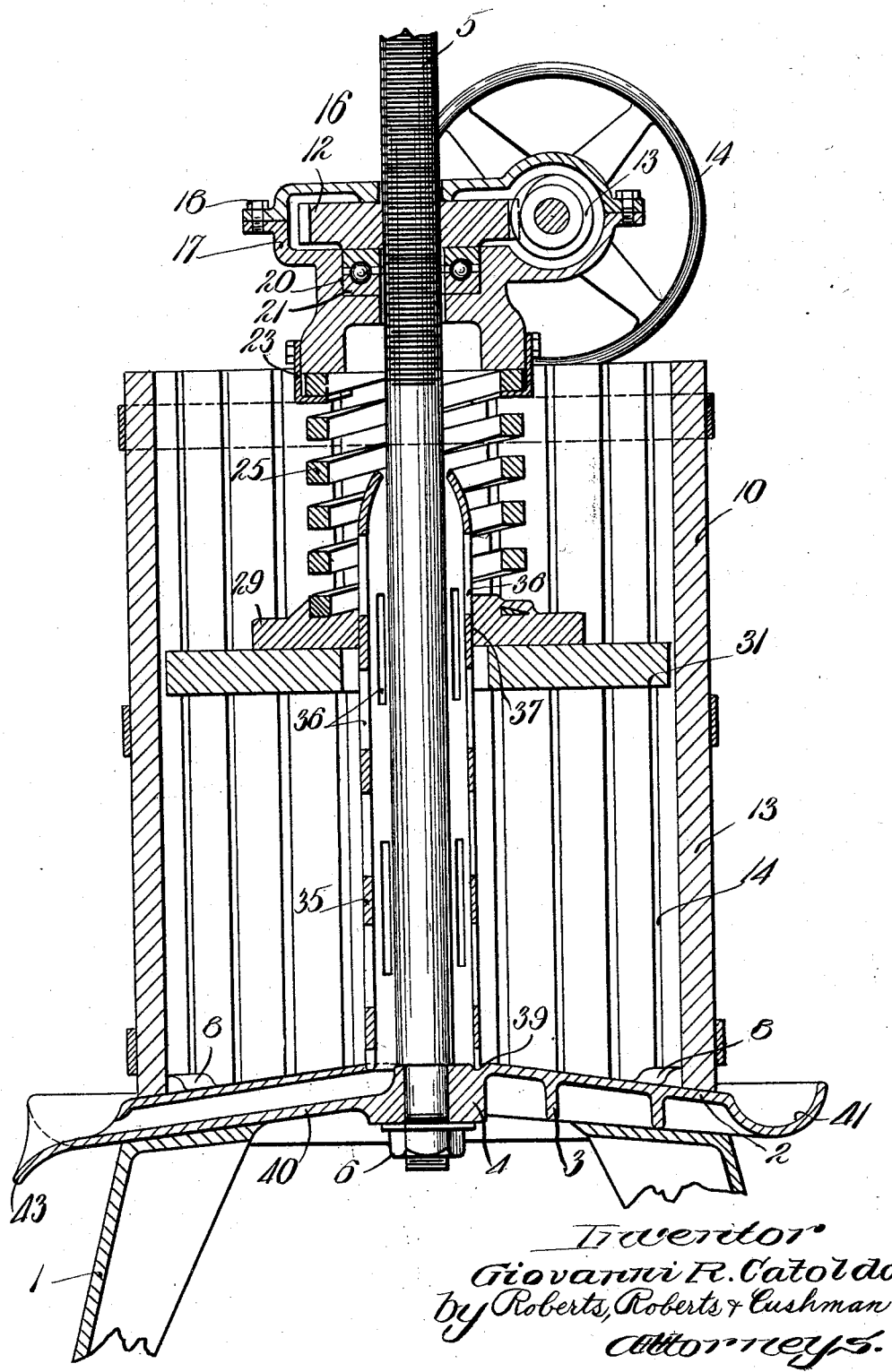

1,803,595

UNITED STATES PATENT OFFICE

GIOVANNI R. CATOLDO, OF BOSTON, MASSACHUSETTS

FRUIT PRESS

Application filed December 16, 1925. Serial No. 75,771.

This invention relates to presses, for example presses designed for the production of cider, grape juice or the like, and more particularly to small hand-operated devices of this character. An object of this invention is the provision of a simple, inexpensive press of this type in which the operating mechanism is arranged to give a high degree of mechanical efficiency and in which the parts are so disposed that the drainage of fruit juices from the press is greatly facilitated. Another object of the invention is the provision of means to protect the mechanism against shocks and to permit the action of the press to continue over a considerably longer period of time than that required by the manual actuation of the operating means.

These and further objects of my invention will be apparent to those skilled in the art upon a reading of the subjoined description and claims in conjunction with the accompanying drawing.

In the drawing the figure is a transverse vertical sectional view of a fruit press constituting a preferred embodiment of my invention.

As shown in the drawing, the truncated conical press is supported upon legs 1 of any desired material, such as pressed metal, and the base plate 2, which is supported upon the legs 1, is provided with suitable ribbing 3 and a central boss 4, which is adapted to receive the lower end of a vertical threaded rod 5 fixed thereto by the nut 6. Upwardly projecting centering lugs 8 are disposed upon the upper outwardly sloping surface of the base plate 2 to engage the inner surface of the casing 10, which may be bi-partite, as is common practice in the art, and which consists of a series of wooden strips 13 with spaces 14 therebetween for the drainage of fruit juices, the above construction being of a more or less conventional nature.

The upper end of rod 5 is threaded at 16 to engage the internally screw threaded worm wheel 12 operated by the worm 13, which may be rotated by the hand wheel 14. The worm 13 and gear 12 are housed in a divided metal casing 17, the halves of which may be secured to each other by cap screws 18, or by any suitable means. Within the casing 17, an annular recess 20 may hold a thrust bearing 21, which is preferably an anti-friction bearing such as a ball bearing.

Secured to the lower portion of casing 17 by the detachable clips 23 is the coiled spring 25, concentrically arranged in relation to the rod 5 and preferably having its lower end embedded in the circular casting or shoe 29, or secured thereto in any suitable manner. Below the plate or shoe 29 is the annular press plate 31, which may be of any desirable form or material. The casting or shoe 29 and press plate 31 may be secured to each other or they may be formed integrally, but preferably they are separate unconnected parts.

Concentrically arranged in relation to the rod 5 is the casing 35 having apertures 36 to provide additional means for the drainage of juices at the center of the press. The upper part of casing 35 is curved inwardly to engage the rod 5 with a loose sliding fit and to constitute means for guiding the opening 37 in plate 29 into sliding engagement with the central casing while press plate 31 may be loosely engaged about the housing 35 in the manner illustrated. A substantially circular groove 39 in the base member 2 engages the lower margin of casing 35, and a radial outlet duct 40 is provided in the member 2 to conduct juices outwardly from the central housing to a circumferential gutter 41, which has a downwardly depending lip 43. The juices from the compressed fruit which flow outwardly through openings 14 or inwardly through openings 36 are thus collected in the gutter 41 and may pour into a vessel, or the like, disposed beneath lip 43.

In the operation of my device the hand wheel 14 is spun to lift plate 29 above the upper level of the casing 13, the press plate 31 being lifted at the same time to permit the disposal of fruit within the press. The hand wheel 14 is then turned to move the entire casing 17, spring 25 and plates 29 and 31 downwardly, pressing the fruit between press plates 31 and base plate 2. The hand wheel 14 may be spun down rapidly, compressing the spring 25 to a greater or lesser extent, and the device may then be left for some time, gradual expansion of the spring causing continued squeezing of the fruit without the necessity of prolonged attention to the device. The spring 25 is furthermore useful in imparting an even pressure to the fruit and in cushioning shocks which may be imparted to the operating mechanism.

When it is desired to clean the device the housing 35, which is loosely mounted in the groove 39 and about the rod 5, may be easily removed. With the plates 29 and 31 readily separable, blocks may be placed between these members to enable the plate 31 to be movable to a substantially lower position than otherwise feasible, thus giving a greater degree of compression, when desired.

I claim:

1. A press comprising a truncated conical base plate having a gutter at its outer edge, a fixed upright screw-threaded rod secured to the center of the base plate, the latter having an annular groove concentric with the rod, centering lugs projecting up from the base plate, said lugs being spaced inwardly from the inner edge of the gutter, an outer cylindrical casing engaging the outer surfaces of said lugs and resting upon the upper surface of the base plate adjacent to the gutter, an inner perforate cylindrical casing concentric with the screw-threaded rod and having its lower end disposed in the annular groove, an annular presser plate having a central opening for the reception of said inner casing, a housing movable longitudinally of the screw-threaded rod, a rotary nut disposed within the housing, said nut having screw-threaded engagement with the rod, a spring interposed between the housing and press plate, and means supported by the housing for turning the nut.

2. Pressure applying mechanism for use in a press having a base plate, inner and outer concentric casings supported by the base plate, a fixed screw-threaded rod projecting from the center of the base plate and an annular presser plate, said pressure applying mechanism comprising a housing movable longitudinally of the rod, said housing having a socket therein, anti-friction bearings in said socket, an annular worm wheel having screw-threaded engagement with the rod, said wheel being enclosed within the housing and resting upon said anti-friction bearing, a worm engaging the worm wheel, means for turning the worm, and a compression spring for transmitting movement of the housing to the presser plate.

3. Pressure applying mechanism for use in a press having a base plate having an outwardly sloping upper surface provided with a drain channel leading outwardly from adjacent to its center, a fixed screw-threaded rod projecting upwardly from the center of the base plate, outer and inner perforate cylindrical casings resting upon the base plate and an annular presser plate, said pressure applying mechanism comprising a housing movable longitudinally of the rod a rotary nut member within the housing, said nut member having screw-threaded engagement with the rod, means mounted on the housing for turning the nut, a coiled compression spring concentric with the rod, means attaching the upper end of the spring to the housing, and a shoe attached to the opposite end of the spring and normally engaging but separable from the presser member, the lower end of the spring being embedded in the shoe.

4. A press of the class described comprising a base plate having an outwardly and downwardly sloping upper surface and means forming a gutter at the marginal portion of said plate, the plate having an annular groove at its central portion and having a passage below its upper surface leading outwardly from said annular groove to the gutter.

5. A press of the class described comprising a base plate having an outwardly sloping upper surface, means providing a gutter at the marginal part of the plate, a fixed screw threaded rod projecting upwardly from the center of the plate for cooperation with pressure applying means, the plate having an annular groove concentric with the rod, and a perforated casing concentric with the rod and having its lower edge seated in the gutter, the plate having a duct extending through its substance from the annular groove to the gutter.

Signed by me at Boston, Massachusetts, this 12th day of December, 1925.

GIOVANNI R. CATOLDO.